(12) United States Patent
Coltrane

(10) Patent No.: US 8,596,183 B2
(45) Date of Patent: Dec. 3, 2013

(54) ASSEMBLY FOR ARMORING AN AMPHIBIOUS VEHICLE AGAINST PROJECTILE PENETRATIONS

(75) Inventor: Michael D. Coltrane, Andover, KS (US)

(73) Assignee: Leading Technology Composites, Inc., Wichita, KS (US)

( * ) Notice: Subject to any disclaimer, the term of this patent is extended or adjusted under 35 U.S.C. 154(b) by 25 days.

(21) Appl. No.: 12/765,546

(22) Filed: Apr. 22, 2010

(65) Prior Publication Data

US 2012/0103177 A1    May 3, 2012

(51) Int. Cl.
*F41H 5/04* (2006.01)
*F41H 7/00* (2006.01)
*B60F 3/00* (2006.01)

(52) U.S. Cl.
USPC ............................... 89/36.12; 89/918

(58) Field of Classification Search
USPC .......... 89/36.12, 36.01, 36.02, 918, 903, 904; 114/9–14
See application file for complete search history.

(56) References Cited

U.S. PATENT DOCUMENTS 5,200,256 A * 4/1993 Dunbar ...................... 428/212

* cited by examiner

*Primary Examiner* — Michael Carone
*Assistant Examiner* — Reginald Tillman, Jr.
(74) *Attorney, Agent, or Firm* — Kenneth H. Jack; Davis & Jack, L.L.C.

(57) ABSTRACT

An assembly for armoring an amphibious vehicle against projectile penetrations, the amphibious vehicle having a hull, the assembly including a rigid spall generating sheet, the rigid spall generating sheet having a thickness and an outer surface; a buoyant sheet fixedly attached to and extending inwardly from the rigid spall generating sheet; and a multiplicity of fasteners interconnecting the rigid and buoyant sheets with the amphibious vehicle's hull, the buoyant sheet incorporating a low density, nonabsorbent hardened foam material; the buoyant sheet functioning for vehicle buoyancy enhancement and for defining a spall dispersal space overlying the hull and underlying the rigid spall generating sheet.

6 Claims, 4 Drawing Sheets

ASSEMBLY FOR ARMORING AN AMPHIBIOUS VEHICLE AGAINST PROJECTILE PENETRATIONS

FIELD OF THE INVENTION

This invention relates to motorized amphibious vehicles. More particularly this invention relates to adaptations of such vehicles wherein such vehicles are armored or protected against ballistic projectile attacks.

BACKGROUND OF THE INVENTION

Heavy military vehicles such as military transport trucks and troop carriers typically incorporate massive steel chassis and suspension components, and such vehicles typically have powerful engines. Where such vehicles are used for ground operations within hostile territories which present a risk of ballistic projectile attack, such vehicles are known to be protectively adapted to include an outer cladding or covering of heavy ballistic armoring material. The installation of such outer protective stratums upon such heavy military vehicles typically results in no unacceptable degradation of the performance of the vehicle. However, the typical acceptability of addition of armor to military land vehicles is not equally experienced when the vehicle is adapted for amphibious operations.

While military amphibious vehicles, like military land vehicles, are typically capable of carrying very heavy exterior armor during land based operations, such armor often undesirably detracts from and degrades the performance of amphibious vehicles during use upon the water. Such degradation of performance may arise as the result of the typically high density relative to water of applied cladding layers of armoring materials. Accordingly, upon installation of armoring materials to the exterior surfaces of the hull of a military amphibious vehicle, the vehicle runs deeper in the water and its unloaded water line rises. As a result, installation of outer cladding armor over the hull of an amphibious military vehicle degrades the vehicle's capacity for carrying troops and cargo.

The instant inventive assembly for armoring amphibious vehicles solves or ameliorates problems discussed above by adapting an applied and installed armoring strata to dually function as a projectile spall generating strike face and for increasing the buoyancy of both the armor and the amphibious vehicle.

BRIEF SUMMARY OF THE INVENTION

A first structural component of the instant inventive assembly for armoring an amphibious vehicle against ballistic projectile attacks and penetrations comprises a rigid projectile strike face sheet having a thickness, an inner surface, and an outer surface. In a preferred embodiment of the instant invention, the rigid strike face sheet comprises a hard and durable ceramic material such as boron carbide ceramic, silicone carbide ceramic or aluminum oxide ceramic. Suitably, the strike face sheet material may comprise a hardened aluminum alloy. Also, suitably, the strike face material may comprise ballistic steel or rolled homogeneous steel armor. Of such materials, the most desirable are those with relatively high hardness to weight ratio for increasing the sheet's ability to fragment impinging projectiles while maximizing buoyancy in water. The thickness of the ballistic strike face material may suitably be increased or decreased in accordance with the level of the ballistic projectile threat present in environments within which the inventive assembly is to be utilized.

A further structural component of the instant inventive amphibious vehicle armoring assembly comprises a relatively thick buoyant sheet which is preferably co-planar or co-extensive with and is fixedly mounted or attached at a position inwardly from the rigid strike face sheet. In a preferred embodiment of the instant inventive assembly, the buoyant sheet is composed of a low density and non-absorbent material. The low density character of the buoyant sheet allows the stratum to effectively counter the typically high density and non-buoyant character of the overlying ballistic strike face sheet. The preferred non-absorbent character of the buoyant sheet advantageously protects from water absorption and "water logging" of the thickened buoyant stratum. In a preferred embodiment, the low density non-absorbent material comprises a matrix of hardened or substantially rigid foam material such as polyisocyanurate foam, polyvinyl chloride foam, polystyrene foam, phenolic foam, polyurea foam, or aluminum foam. Preferably, the thickness of the buoyant stratum is at least as great as that of the ballistic strike face stratum. In operation, the buoyant stratum advantageously dually functions for buoyancy enhancement and for projectile spall distribution.

A further structural component of the instant inventive amphibious vehicle armoring assembly comprises hull mounting means which are adapted for fixedly attaching and positioning the assembly's strike face and buoyant sheets over the amphibious vehicle's hull. In a preferred embodiment, the hull mounting means comprises a multiplicity of steel post fasteners or fastener receiving sockets which are welded to and extend outwardly from the amphibious vehicle's typically steel hull, and which securely attach the strike face and buoyant sheet armoring stratums to the hull. The scope of the invention is intended to cover numerous other suitable means for fastening sheet structures to hulls such as adhesives and plate capturing and retaining brackets.

Also in the preferred embodiment, the strata of the instant inventive assembly further comprises a rigid structural support sheet which overlies the buoyant layer and provides underlying base support to the strike face layer. All stratums of the assembly are preferably interstitially adhesively attached.

In use of the instant inventive assembly for armoring an amphibious vehicle, an amphibious vehicle bearing such armoring assembly may enter a river or lake for amphibious operations and, as a result of additional flotation provided by the buoyant layer, the vehicle maintains a water line or floating level within the water which is substantially the same as that maintained by a similar but unarmored amphibious vehicle. Thus, the vehicle's load carrying capacity remains substantially unaltered by the installation of the inventive armoring assembly. Upon experiencing a projectile attack, the buoyant layer of the armoring assembly advantageously further functions to provide a projectile spall dispersion zone which minimizes the possibility that projectile spall fragments generated by the strike face will reach the hull with sufficient concentration to penetrate the amphibious vehicle's hull.

Accordingly, it is an object of the instant invention to provide an assembly for armoring an amphibious vehicle against ballistic projectile penetrations which incorporates structural components, as described above, and which arranges those structural components with respect to each other in the manners described above.

Other and further objects, benefits, and advantages of the present invention will become known to those skilled in the

DETAILED DESCRIPTION OF A PREFERRED EMBODIMENT

Figure 1:
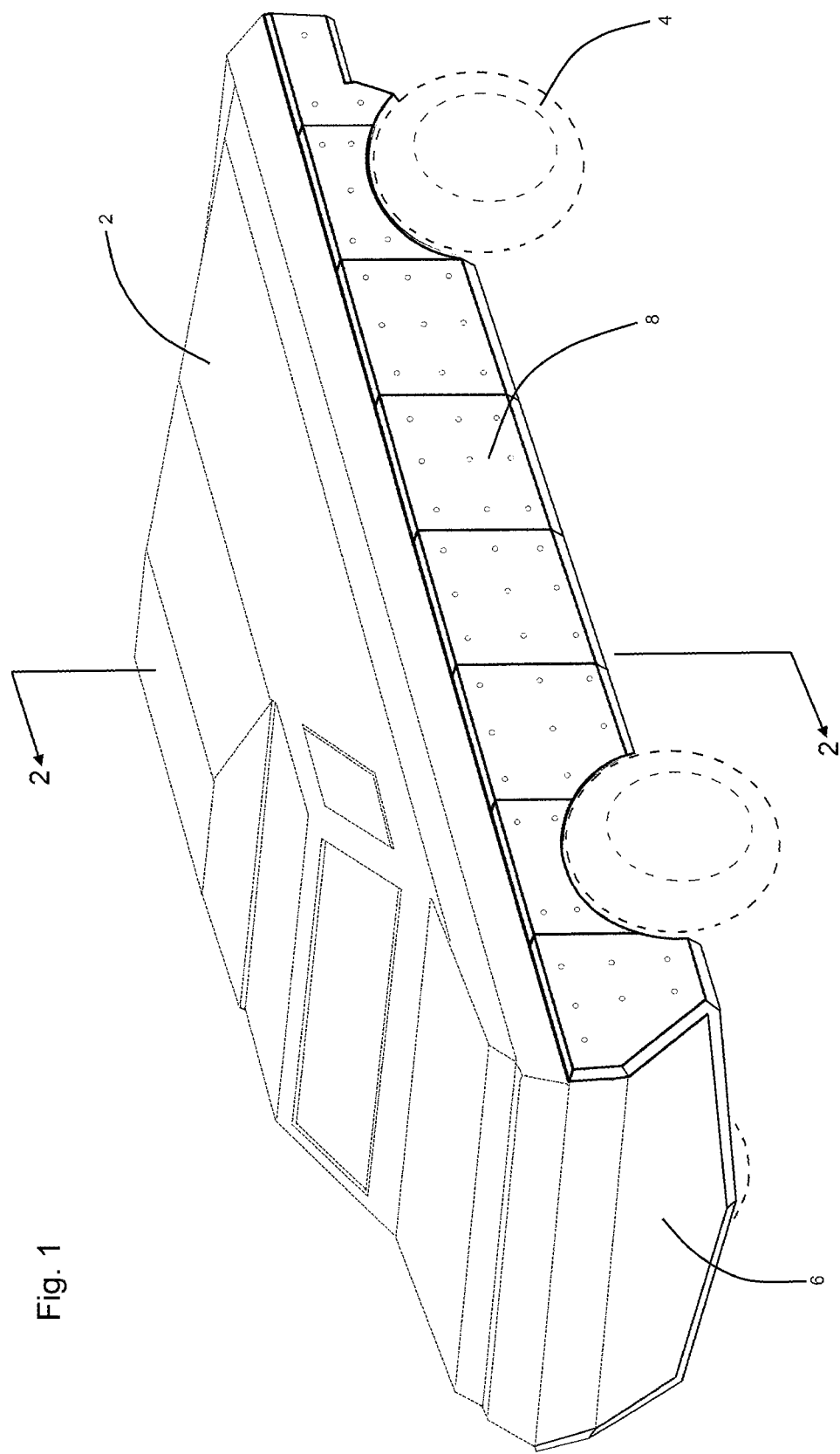
FIG. 1 is a perspective view of the instant inventive assembly for armoring an amphibious vehicle against projectile penetrations, the assembly being shown as applied to and installed upon an exemplary amphibious vehicle.

Referring now to the drawings, and in particular to FIG. 1, a military amphibious vehicle 2 has a steel hull wall 6 that extends from the vehicle's bow to stern and from its starboard side to port. For use in land operations, the vehicle 2 has powered wheels 4. Alternatively, for use in water operations, the vehicle typically has an engine driven stern mounted water propulsion drive (not within view) such as an exposed propellor or a steerable water jet nozzle.

Figure 2:
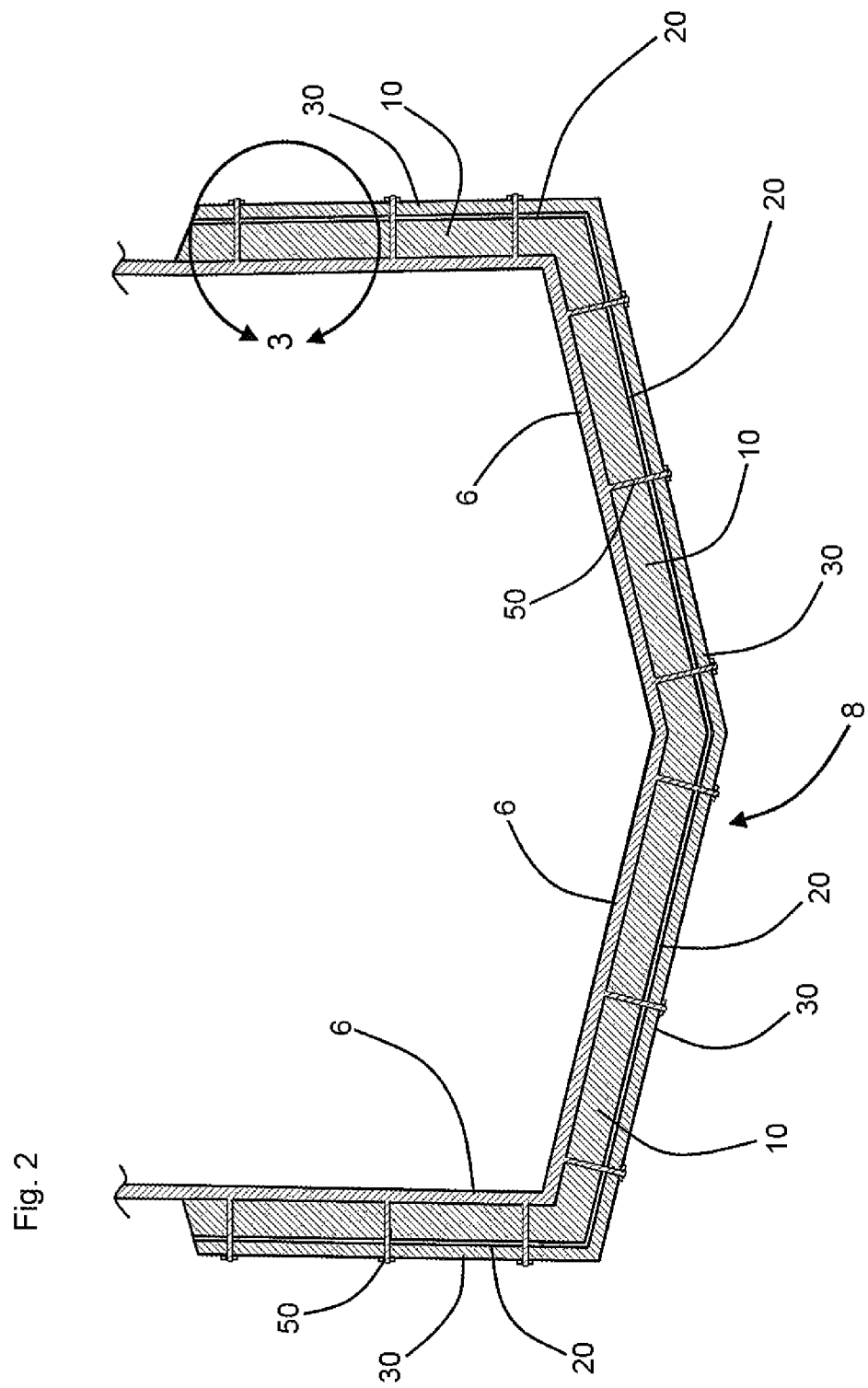
FIG. 2 is a sectional view as indicated in FIG. 1.
Figure 3:
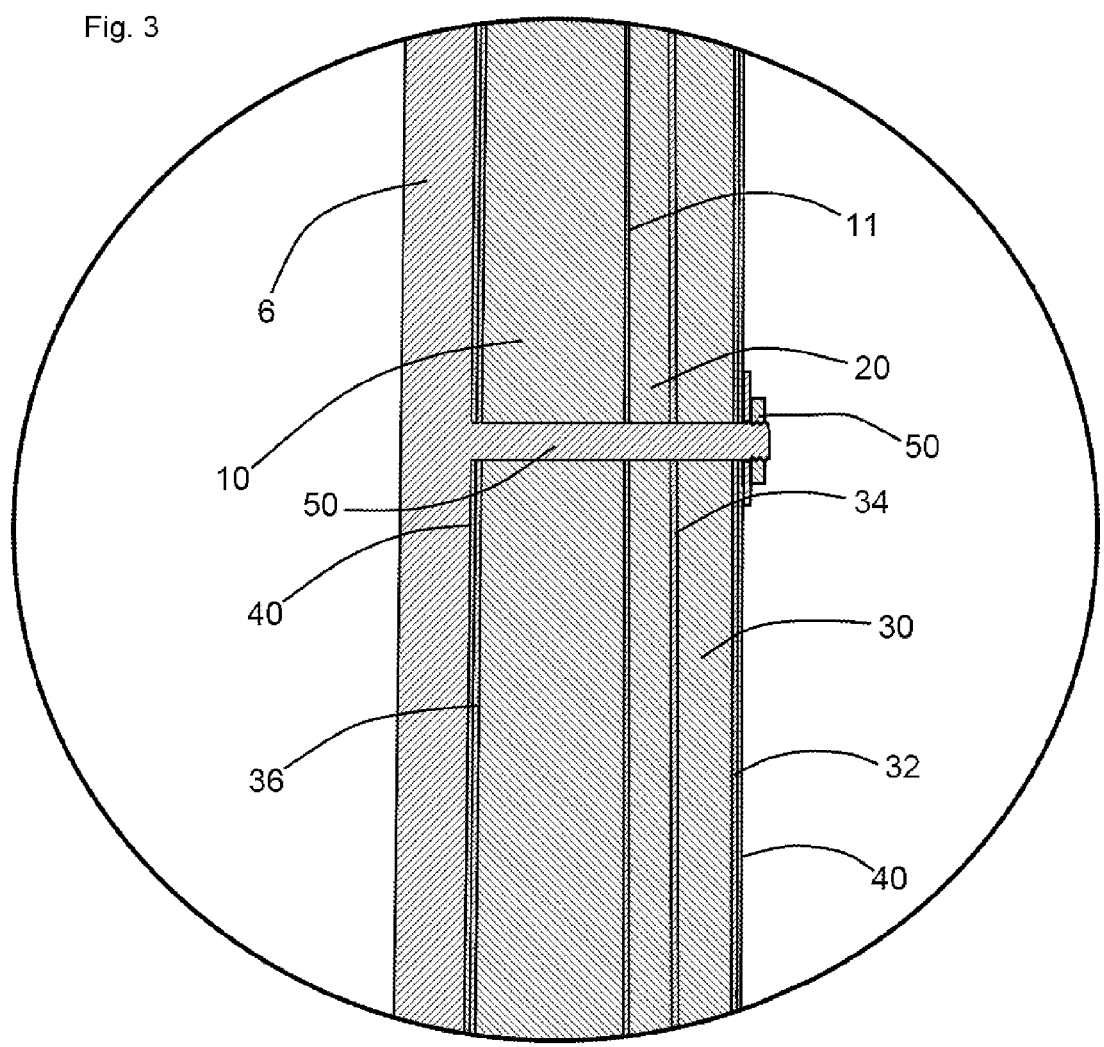
FIG. 3 is a magnified view of a portion of the structure of FIG. 2, an indicated in FIG. 2.

Referring further to FIG. 1, an exterior armoring strata 8 is securely mounted over the starboard and port sides of the vehicle's hull 6, and such armoring strata extends over the undersurfaces of the hull 6 from the vehicle's bow end to its stern. Referring further simultaneously to FIGS. 2 and 3, the armoring strata 8 comprises a relatively thick buoyant sheet 10. As depicted, the buoyant sheet 10 is approximately twenty millimeters thick. The buoyant sheet 10 preferably comprises a hardened and water resistant or non-absorbent foam matrix consisting of polyisocyanurate foam, polyvinyl chloride foam, polystyrene foam, phenolic foam, polyurea foam, or aluminum foam. A rigid structural support sheet 20 preferably consisting of a light weight carbon fiber laminate material is preferably fixedly attached by an adhesive layer 11 to the outer surfaces of the buoyant sheet 10, the structural support sheet 20 preferably being co-planar and co-extensive with the buoyant sheet 10.

In order to enhance the assembly's capability for suppressing projectile penetrations, a hard and rigid strike face 30 is preferably provided. In operation, referring further to FIG. 4, projectiles directed toward the amphibious vehicle's hull 6 initially impinge against the strike face 30. Upon such contact, the projectile is either turned in its path 60, is fragmented into small spall particles or fragments 62, or both. The thickness of the foam buoyant layer 10 advantageously provides space for lateral dispersion of the spall 62, or for turning of a pointed armor piercing projectile (not depicted), either of such effects reducing the ability of the spall 62 or turned projectile to pierce hull 6. In a preferred embodiment, the strike face 30 comprises multiple ceramic plate or tile sections. Suitably, the strike face 30 may alternatively comprise a hardened aluminum or steel skin layer. The inner and outer surfaces of the strike face 30 are preferably protected by cladding layers of fiberglass 34 and 32, and the inner surface of the buoyant sheet 10 is preferably similarly protectively clad by an inner fiberglass layer 36. Such fiberglass cladding layers adhesively bond the stratums of the assembly into a unitary armoring strata.

Referring simultaneously to all figures, while the non-absorbent character of the buoyant foam sheet 10 advantageously resists water absorption and "water logging" of the assembly, further resistance to water absorption is preferably provided by encapsulating all exposed surfaces of the assembly's buoyant, ballistic, and strike face stratums within a polymer coating, preferably a polyurea coating 40. Means for mounting the inventive armoring assembly over the hull 6 of the amphibious vehicle 2 are also provided, such means suitably comprising a multiplicity of fixedly attached and outwardly extended mounting posts 50 which extend through the several stratums of the assembly. The mounting posts 50 are intended as being representative of other commonly known and means for mounting sheet or plate structures upon planar surfaces such as boat hulls.

Figure 4:
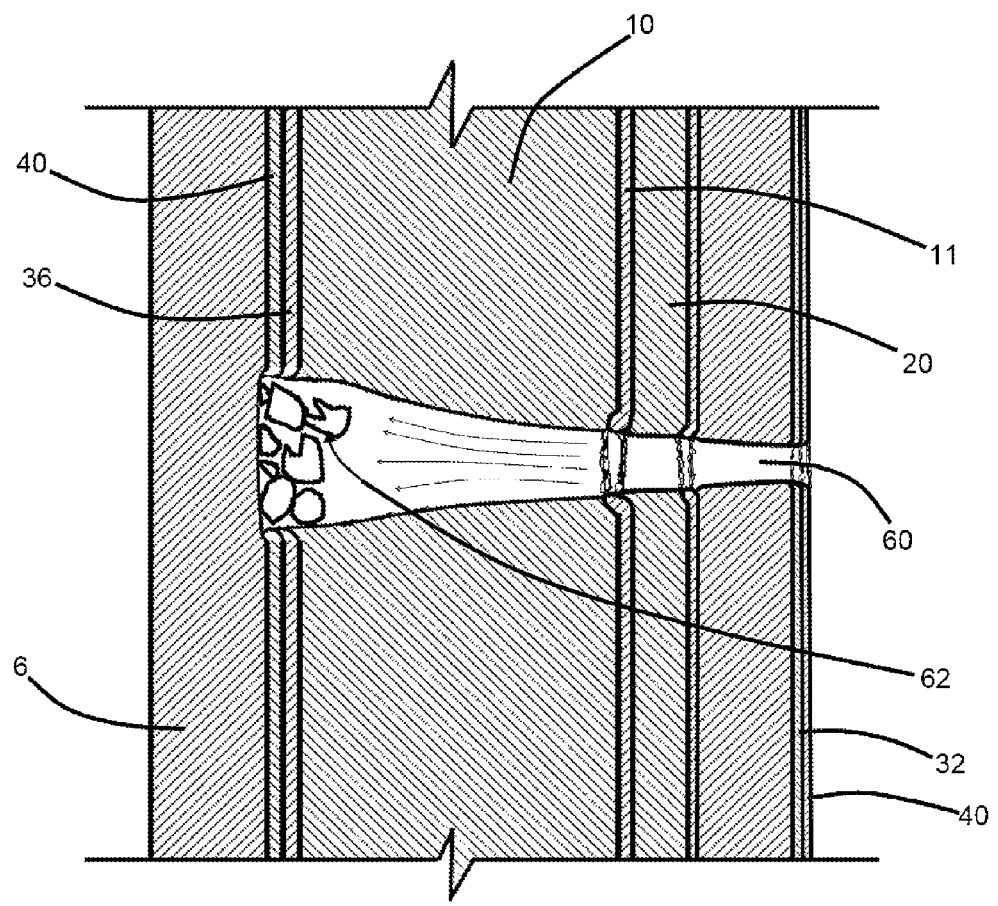
FIG. 4 presents an alternative sectional view demonstrating the assembly's projectile spall dispersing function.

Referring to FIGS. 1-4, upon entry of the amphibious vehicle 2 into the water, the buoyant stratum 10 of the armoring assembly 8 counters the negative buoyancy of all of the other stratums of the assembly, such buoyancy compensation enabling the vehicle 2 to maintain substantially the same water line and floating depth as the vehicle would otherwise maintain without the installation of any external armoring. Accordingly, utilization of the instant inventive assembly allows for protective armoring of exposed amphibious vehicle hull surfaces, while preserving the vehicle's personnel and cargo carrying capacity. Upon projectile impingement as depicted in FIG. 4, the buoyant layer 10 further functions for dispersion of spall 62 or projectile turning. By providing both buoyancy and spall dispersion, the stratum 10 of the assembly achieves a high level of armoring protection without unduly degrading the floating character of the vehicle.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An armoring assembly in combination with an amphibious vehicle, the armoring assembly being for protecting the amphibious vehicle against projectile penetrations, the amphibious vehicle having a floatation hull having an outer surface and having unloaded and armored water level floatation lines, the armoring assembly comprising:

(a) a projectile spall dispersing buoyant sheet having inner and outer surfaces, the projectile spall dispersing buoyant sheet comprising a low density, nonabsorbent material;

(b) a strata having a thickness, the strata comprising a plurality of stratums, said stratum plurality comprising an innermost stratum having an inner surface and an outermost stratum having an outer surface, said innermost stratum's inner surface being adhesively bonded to the projectile spall dispersing buoyant sheet's outer surface, and said outermost stratum's outer surface, upon the floatation within the water, contacting the water, at least a first stratum among the plurality of stratums comprising a rigid ballistic material sheet, the strata's thickness extending from said innermost stratum's inner surface to said outermost stratum's outer surface; and (c) hull mounting means fixedly positioning the strata and the projectile spall dispersing buoyant sheet over the outer surface of the amphibious vehicle's flotation hull; wherein the projectile spall dispersing buoyant sheet has a thickness, wherein the projectile spall dispensing buoyant sheet's thickness is at least as great as the strata's thickness, wherein the rigid ballistic material sheet comprises a projectile spall generating stratum, and wherein the strata's innermost stratum comprises rigid structural support sheet.

2. The assembly for armoring an amphibious vehicle of claim 1 wherein the low density, non-absorbent material comprises hardened foam.

3. The assembly for armoring an amphibious vehicle of claim 2 wherein the hardened foam comprises a material selected from the group consisting of polyisocyanurate foam, polyvinyl chloride foam, polystyrene foam, polyurethane foam, phenolic foam, and aluminum foam.

4. The assembly for armoring an amphibious vehicle of claim 1 wherein the rigid ballistic material sheet comprises a material selected from the group consisting of boron carbide ceramic, silicone carbide ceramic, aluminum oxide ceramic, hardened aluminum alloy, and steel, and wherein the rigid structural support sheet comprises a carbon fiber laminate.

5. The assembly for armoring an amphibious vehicle of claim 1 further comprising an encapsulating layer fixedly attached to and enveloping the rigid ballistic material sheet and the projectile spall dispersing buoyant sheet, the encapsulating layer comprising the strata's outermost stratum.

6. The assembly for armoring an amphibious vehicle of claim 5 wherein the encapsulating layer comprises a polymer coating.

* * * * *